(12) United States Patent
Tsai et al.

(10) Patent No.: US 9,195,050 B2
(45) Date of Patent: Nov. 24, 2015

(54) ELECTROWETTING DISPLAY PANEL WITH HIGH TRANSPARENCE

(71) Applicant: Industrial Technology Research Institute, Hsinchu (TW)

(72) Inventors: Yu-Hsiang Tsai, Hsinchu County (TW); Kuo-Lung Lo, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 134 days.

(21) Appl. No.: 14/019,541

(22) Filed: Sep. 6, 2013

(65) Prior Publication Data
US 2014/0355099 A1 Dec. 4, 2014

(30) Foreign Application Priority Data
May 28, 2013 (TW) .............................. 102118781 A

(51) Int. Cl.
*G02B 26/00* (2006.01)

(52) U.S. Cl.
CPC .................................. *G02B 26/005* (2013.01)

(58) Field of Classification Search
None
See application file for complete search history.

(56) References Cited

U.S. PATENT DOCUMENTS

| 7,852,547 B2 | 12/2010 | Kim |
| 8,004,738 B2 | 8/2011 | Yang et al. |
| 8,111,447 B2 | 2/2012 | Fairly et al. |
| 8,189,267 B2 | 5/2012 | Slack et al. |
| 2006/0285067 A1 | 12/2006 | Kim |
| 2009/0058840 A1 | 3/2009 | Lee et al. |
| 2009/0085909 A1 | 4/2009 | Chen et al. |
| 2010/0030261 A1 | 2/2010 | McClain |
| 2010/0066969 A1 | 3/2010 | Hwang et al. |
| 2010/0302615 A1 | 12/2010 | Aubert et al. |
| 2011/0141548 A1 | 6/2011 | Yang et al. |
| 2011/0227080 A1 | 9/2011 | Roh et al. |
| 2012/0243071 A1* | 9/2012 | Lee et al. ...................... 359/290 |
| 2013/0141317 A1 | 6/2013 | Choi et al. |
| 2014/0016176 A1* | 1/2014 | Kodani et al. .................. 359/290 |

FOREIGN PATENT DOCUMENTS

| TW | I364553 | 5/2012 |
| TW | 201239392 | 10/2012 |
| TW | 201239905 | 10/2012 |

OTHER PUBLICATIONS

"Office Action of Taiwan Counterpart Application", issued on Sep. 23, 2014, p. 1-p. 8.

(Continued)

*Primary Examiner* — Kenneth B Lee, Jr.
(74) *Attorney, Agent, or Firm* — Jianq Chyun IP Office

(57) ABSTRACT

An electro-wetting display panel including an active device array substrate, a dielectric layer, a rib structure, an opposite substrate, a first fluid and a second fluid is provided. The active device array substrate includes a first substrate and a plurality of pixel structures. Each pixel structure includes a shielding electrode connected to a common potential, an active device located between the shielding electrode and the first substrate, and a pixel electrode electrically connected to the active device. The dielectric layer covers the pixel structures. The rib structure is disposed on the active device array substrate and has openings. The active device and the pixel electrode of each pixel structure are located within one of the openings. The first fluid is configured between the dielectric layer and the opposite substrate. The second fluid is configured between the dielectric layer and the first fluid.

20 Claims, 11 Drawing Sheets

(56) References Cited

OTHER PUBLICATIONS

Hayes et al., "Video-speed electronic paper based on electrowetting," Nature 425, Sep. 25, 2003, pp. 383-385.

Sun et al., "Scalable fabrication of electrowetting displays with self-assembled oil dosing," Applied Physasics Letters 91, Jul. 2, 2007, pp. 011106-1-3.

Kuo et al, "Single Layer Multi-Color Electrowetting Display by Using Ink Jet Printing Technology and Fluid Motion Prediction with Simulation," SID 10 Digest, vol. 41, Issue 1, May 2010, pp. 939-942.

Heikenfeld et al., "Electrofluidic displays using Young-Laplace transposition of brilliant pigment dispersions," Nature Photonics 3, May 2009, pp. 292-296.

Song et al., "A scaling model for electrowetting-on-dielectric microfluidic actuators," Microfluidics and Nanofluidics, vol. 7, Issue 1, Nov. 2008, pp. 75-89.

Kuo et al., "A Novel Electrowetting-based Display for Future Smart Window Application," SID 11 Digest, vol. 42, Issue 1, Jun. 2011, pp. 232-235.

* cited by examiner

ELECTROWETTING DISPLAY PANEL WITH HIGH TRANSPARENCE

CROSS-REFERENCE TO RELATED APPLICATION

This application claims the priority benefit of Taiwan application serial no. 102118781, filed on May 28, 2013. The entirety of the above-mentioned patent application is hereby incorporated by reference herein and made a part of this specification.

TECHNICAL FIELD

The disclosure discloses a display device structure and particularly to an electro-wetting display panel structure.

BACKGROUND

Generally, an electro-wetting display panel includes an upper electrode, a lower electrode, and a polar fluid as well as a non-polar fluid sandwiched between the two electrodes. A method for operating the electro-wetting display panel is that, when voltage is not applied, the non-polar fluid spreads over a pixel unit so that an incident light can be absorbed by the non-polar fluid, and the pixel unit presents a dark state consequently. In addition, when the pixel unit presents a bright state, the voltage is applied to the upper and lower electrodes so that the non-polar fluid is concentrated and the proportion of the non-polar fluid in the pixel unit is reduced. Consequently, a reflective layer or light source under the non-polar fluid is exposed, such that the incident light is reflected by the reflective layer or the light of the light source may pass through an exposed region of the pixel unit to present a bright state.

Generally speaking, the voltage may be applied through an active device (such as a thin film transistor) in the pixel unit, wherein the active device mostly uses an electrode formed of an opaque metal for transmitting signals. The active device has to maintain the transmission of electrical signals, causing the non-polar fluid unable to be stably concentrated in a region above the active device. Therefore, in the known designs, in a state where the voltage is applied to the pixel unit, the region occupied by the concentrated non-polar fluid and the region where the active device is located are independent of each other; meanwhile, both regions do not reflect light or unable to be passed through by light, that is, they are unable to become effective display regions, which restricts the display aperture ratio of the electro-wetting display panel.

SUMMARY

The disclosure provides an electro-wetting display panel having an ideal display aperture ratio.

In the disclosure, the electro-wetting display panel includes an active device array substrate, a dielectric layer, a rib structure, an opposite substrate, a first fluid, and a second fluid. The active device array substrate includes a first substrate and a plurality of pixel structures. The pixel structures are configured on the first substrate, wherein each pixel structure includes a shielding electrode, an active device, and a pixel electrode electrically connected to the active device. The active device is positioned between the shielding electrode and the first substrate, and the shielding electrode is connected to a common potential. The dielectric layer is configured on the active device array substrate and covers the pixel structures. The rib structure is configured on the active device array substrate and has a plurality of openings. The active device of each of the pixel structures and the pixel electrode are positioned within one of the openings. The pixel structure is positioned between the first substrate and the opposite substrate. The first fluid is configured between the dielectric layer and the opposite substrate. The second fluid is configured between the dielectric layer and the first fluid.

In the disclosure, another electro-wetting display panel includes an active device array substrate, a dielectric layer, a rib structure, an opposite substrate, a first fluid, and a second fluid. The active device array substrate includes a first substrate, a plurality of scan lines, a plurality of data lines, and a plurality of pixel structures. The pixel structures are configured on the first substrate. Each of the pixel structures includes a shielding electrode, an active device, and a pixel electrode electrically connected to the active device. The active device is positioned between the shielding electrode and the first substrate. The scan lines turns on or off the active device of the pixel structure so as to transmit the voltage on the data lines to a corresponding pixel electrode via the active device. Moreover, the shielding electrode and active device of each of the pixel structures are respectively connected to the $i^{th}$ and the $j^{th}$ scan lines, wherein i and j are positive integers and j is not equal to i. The dielectric layer is configured on the active device array substrate and covers the pixel structures. The rib structure is configured on the active device array substrate and has a plurality of openings. The active device of each of the pixel structures and the pixel electrode are located within one of the openings. The pixel structures are located between the first substrate and the opposite substrate. The first fluid is configured between the dielectric layer and the opposite substrate. The second fluid is configured between the dielectric layer and the first fluid.

Based on the above, the pixel structures in an embodiment of the disclosure include the shielding electrode covering the active device, and the shielding electrode may even further cover a storage capacitor structure. Therefore, when the active device transmits of the electrical signals, the shielding effect provided by the shielding electrode may reduce the influence of signal transmission on the first fluid. Thus, the second fluid may be concentrated above the active device without having to be concentrated outside the active device, thereby improving the display aperture ratio of the electro-wetting display panel.

In order to make the aforementioned features and advantages of the disclosure more comprehensible, embodiments accompanying figures are described in detail below.

BRIEF DESCRIPTION OF THE DRAWINGS

FIGS. 1B and 1C are cross-sectional views illustrating the electro-wetting display panel in FIG. 1A cut along line I-I' and line II-II', wherein FIGS. 1B and 1C represent different display statuses.

FIGS. 4A and 4B are local cross-sectional views illustrating an electro-wetting display panel in a fourth embodiment in the disclosure, wherein FIGS. 4A and 4B represent different statuses.

FIGS. 6A and 6B are cross-sectional views illustrating the electro-wetting display panel in FIG. 5 cut along line III-III', wherein FIGS. 6A and 6B represent different statuses.

FIGS. 8A and 8B are cross-sectional views illustrating the electro-wetting display panel in FIG. 7 cut along line IV-IV', wherein FIGS. 8A and 8B represent different statuses.

DESCRIPTION OF EMBODIMENTS

Figure 1A:
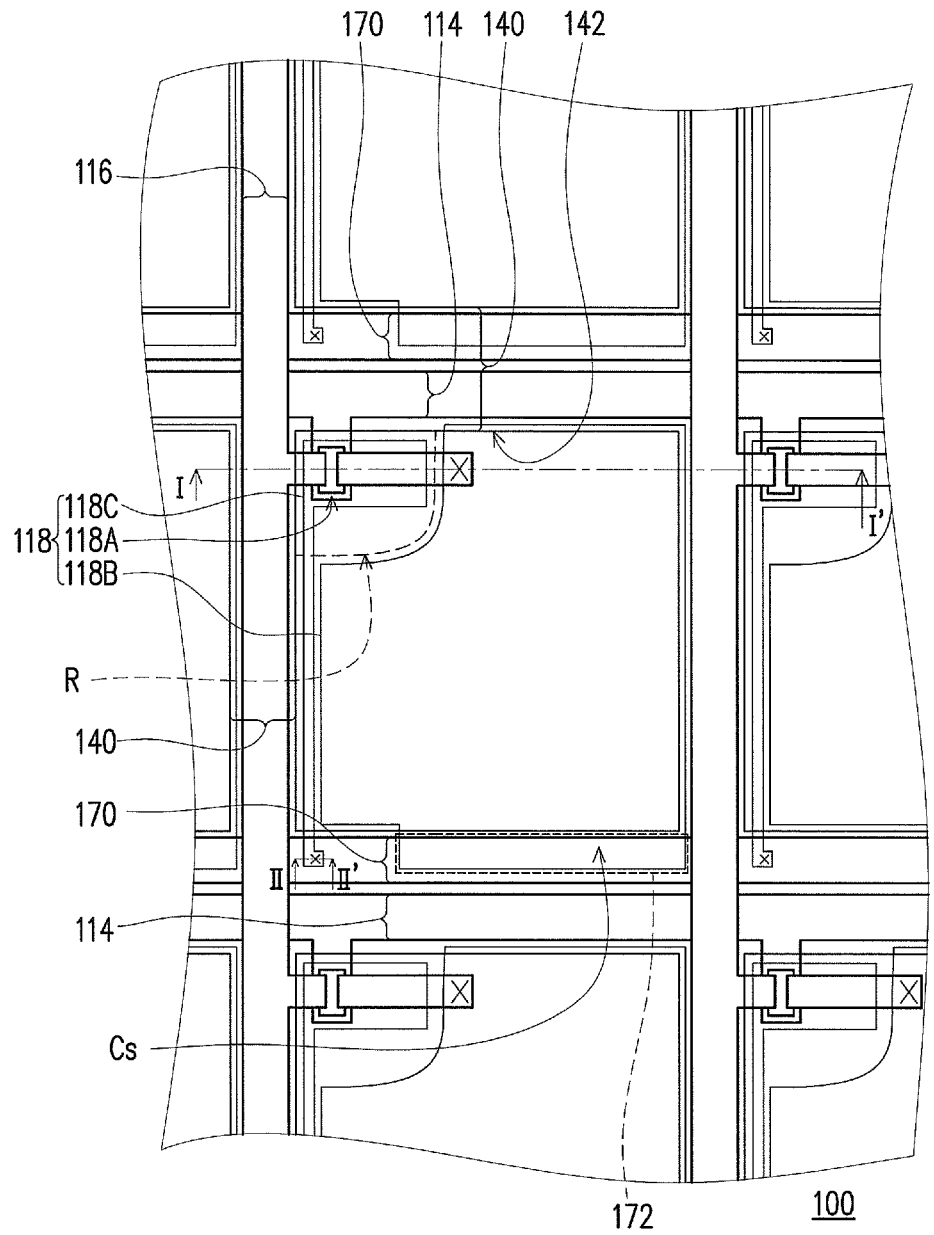
FIG. 1A is a local top view illustrating an electro-wetting display panel in a first embodiment in the disclosure.
Figure 1B:
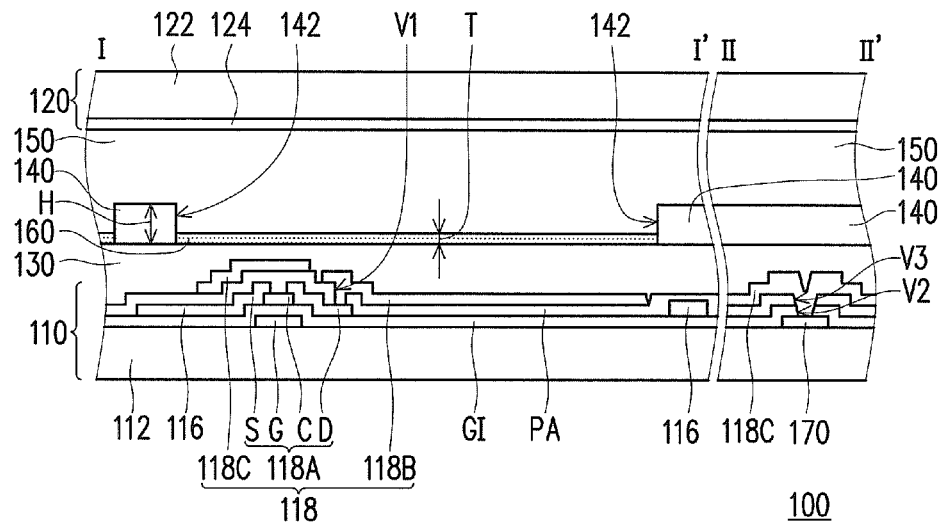
Figure 1C:
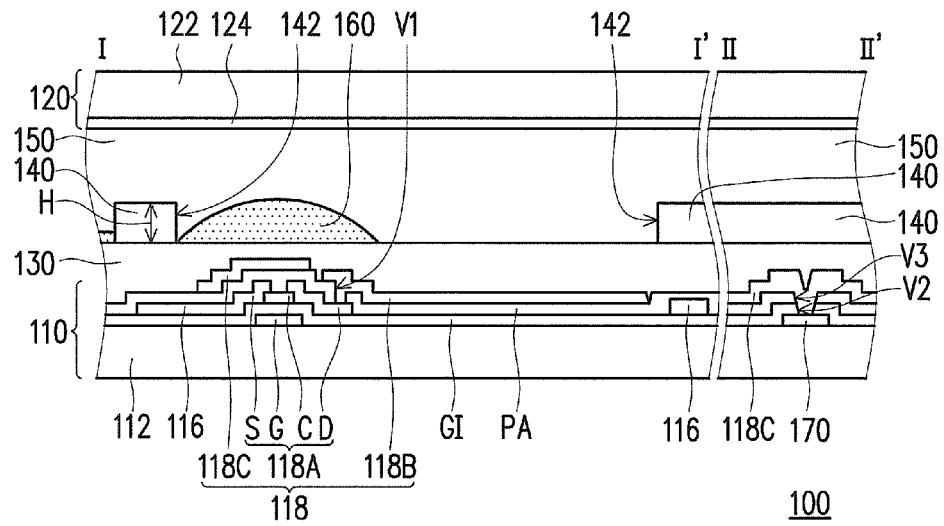

FIG. 1A is a local top view illustrating an electro-wetting display panel in a first embodiment in the disclosure. FIGS. 1B and 1C are cross-sectional views illustrating the electro-wetting display panel in FIG. 1A cut along line I-I' and line II-II', wherein FIGS. 1B and 1C represent different display statuses. Please refer to both FIGS. 1A and 1B. An electro-wetting display panel 100 includes an active device array substrate 110, an opposite substrate 120, a dielectric layer 130, a rib structure 140, a first fluid 150, and a second fluid 160. In the embodiment, the active device array substrate 110 faces the opposite substrate 120. The dielectric layer 130 and the rib structure 140 are both configured on the active device array substrate 110, and the rib structure 140 defines a plurality of openings 142. The first fluid 150 and the second fluid 160 are both configured between the active device array substrate 110 and the opposite substrate 120. Meanwhile, the second fluid 160 is located between the first fluid 150 and the active device array substrate 110. Here, one of the first fluid 150 and the second fluid 160 is a polar fluid and the other one is a non-polar fluid; therefore, the first fluid 150 and the second fluid 160 are substantially immiscible. It should be noted that FIG. 1 represents a top view of the stacked electro-wetting display panel 100; therefore, some of the stacked components are unable to be shown in FIG. 1A. Nevertheless, persons having ordinary skill in the art can refer to FIGS. 1A and 1B to see the components not shown in FIG. 1A.

Specifically, the active device array substrate 110 includes a first substrate 112, a plurality of scan lines 114, a plurality of data lines 116, and a plurality of pixel structures 118, wherein each of the pixel structures 118 includes an active device 118A, a pixel electrode 118B, and a shielding electrode 118C, and each of the pixel structure 118 is located within one of the corresponding openings 142. That is to say, in the embodiment, the rib structure 140 does not completely block the active device 118A, the pixel electrode 118B, and the shielding electrode 118C. The active device 118A is connected to a corresponding scan line 114 and a corresponding data line 116; the pixel electrode 118B is electrically connected to the active device 118A. In addition, at least a portion of the region of the shielding electrode 118C is located above the active device 118A so that the active device 118A is located between the shielding electrode 118C and the first substrate 112. In the embodiment, the pixel electrode 118B and the shielding electrode 118C may be fabricated with the same conductive material layer in the same process; however, the disclosure is not limited thereto. Moreover, the shielding electrode 118C is electrically independent of the pixel electrode 118B and connected to a common potential. For example, at least one common electrode line 170 may be configured on the active device array substrate 110, and the shielding electrode 118C may be electrically connected to the common electrode line 170. At this time, the common electrode line 170 is used to transmit the common potential, and the common potential may be a ground potential or a reference potential. In addition, the pixel electrode 118B may be partially overlapped on the common electrode line 170 so as to constitute a storage capacitor structure Cs required by the pixel structure 118. Therefore, the portion where the common electrode line 170 overlaps with the pixel electrode 118B may be regarded as a storage capacitor electrode 172.

In the active device array substrate 110, the active device 118A in each of the pixel structures 118 includes a gate G, a channel layer C, a source S, and a drain D, wherein the gate G is connected to the scan lines 114, the channel layer C is located above the gate G, the source S is connected to the data lines 116, and the source S as well as the drain D are in contact with the channel layer C and located at two sides of the gate G. Accordingly, the scan lines 114 are user for turning on or off the active device 118A so that the voltage on the data lines 116 is correspondingly transmitted to the pixel electrode 118B. Here, the active device 118A is described using the structure of a bottom gate type thin film transistor as an example; however, the disclosure is not limited thereto. For example, in other embodiments, the active device 118A may be realized via a top gate type thin film transistor. In addition, the channel layer C in the active device 118A may be fabricated using a semiconductor material, wherein the semiconductor material includes an amorphous-Si, a polysilicon, an oxide semiconductor, an organic semiconductor, or other materials with a semiconductor property.

Additionally, the active device array substrate 110 further includes a gate insulating layer GI and a protecting layer PA, wherein the gate insulating layer GI is configured between the gate G and the channel layer C, and can cover the scan lines 114 and the common electrode line 170; the protecting layer PA covers the active device 118A, the scan lines 114, the data lines 116, and the common electrode line 170. At this time, in order for the pixel electrode 118B to be connected to the active device 118A, a via V1 is configured in the protecting layer PA so that the pixel electrode 118B is in contact with the drain D through the via V1. Besides, in order to realize the electrical connection between the shielding electrode 118C and the common electrode line 170, a via V2 is configured in the gate insulating layer GI, and another via V3 is configured in the protecting layer PA. The via V2 and the via V3 are communicated to each other so that the shielding electrode 118C is in contact with the common electrode line 170 via the via V2 and the via V3. In an embodiment, the via V1, the via V2, and the via V3 may be fabricated through the same patterning process.

An opposite substrate 120 includes a second substrate 122 and an opposite electrode 124, wherein the first substrate 112 and the second substrate 122 are, for example, transparent substrates. The opposite electrode 124 may be applied with a common voltage; therefore, when the pixel electrode 118B is also applied with voltage, a voltage difference between the opposite electrode 124 and the pixel electrode 118B causes that a polar first fluid 150 has affinity to the dielectric layer 130 surface, which then changes the distribution status of the second fluid 160 and the first fluid 150.

In the embodiment, the dielectric layer 130 is configured on the active device substrate 110 and covers the pixel structures 118. Meanwhile, the rib structure 140 is configured on the dielectric layer 130. In a preferred embodiment, the rib structure 140 is used for limiting the distribution of the second fluid 160; as a result, the second fluid 160 may flow between the first fluid 150 and the dielectric layer 130 without overflowing into the adjacent pixel structures. Moreover, in order to achieve the display effect, the first fluid 150 may be a transparent fluid, and the second fluid 160 may have a light absorption property or may be a non-transparent fluid with visible color. Therefore, the second fluid 160 may provide different display effects under different distribution statuses.

In the embodiment, the dielectric layer 130 and the rib structure 140 have different properties so that the second fluid 160 keeps flowing between the first fluid 150 and the dielectric layer 130. When the rib structure 140 is hydrophilic, the dielectric layer 130 may be hydrophobic; the first fluid 150 is a polar fluid whereas the second fluid 160 is a non-polar fluid. The dielectric layer 130 may be a multilayer structure. In an embodiment, the dielectric layer 130 may be formed by stacking an insulating film layer with a hydrophobic film layer, and the hydrophobic film layer covers the insulating film layer. In addition, the dielectric layer 130 may be formed optionally by stacking multiple insulating layers with multiple hydrophobic film layers alternately upon one another.

Specifically, please refer to FIG. 1B. In the embodiment, when the voltage is not applied to the pixel electrode 118B of the pixel structure 118, the dielectric layer 130 has greater affinity with the second fluid 160 than with the first fluid 150. Therefore, the second fluid 160 will be distributed diffusely between the dielectric layer 130 and the first fluid 150. In addition, please refer to FIGS. 1C and 1A, when the voltage is applied to the pixel electrode 118B and the opposite electrode 124, the surface of the dielectric layer 130 has an increased affinity with the first fluid 150. Therefore, the second fluid 160 will be pushed against the first fluid 150 to flow to an edge of the opening 142 and is concentrated in a concentrating region R to expose a large portion of the area of the opening 142.

When the electro-wetting display panel 100 is applied in the transmissive type display, the electro-wetting display panel 100 may be configured above a backlight module (not shown). Under the status shown in FIG. 1B, based on the light absorption property of the second fluid 160, the light of the backlight module is unable to pass through the opening 142 to present a dark state. Under the status shown in FIG. 1C, based on a large portion of the area of the opening 142 which is exposed when the second fluid 160 is concentrated in the concentrating region R, the light of the back light module can pass through the opening 142 to present a bright state.

In other embodiments, when the electro-wetting display panel 100 is applied in the reflective display, an additional reflective layer (not shown) may be configured in a non-active device region of the electro-wetting display panel 100, or configured between the first substrate 112 and the dielectric layer 130 (not shown), or the dielectric layer itself is a reflective layer, or the pixel electrode 118B itself is a reflective electrode. Under the status shown in FIG. 1B, based on the light absorption property of the second fluid 160, the incident light coming from the outside cannot pass through the second fluid 160, and therefore it is not reflected by the reflective layer or the pixel electrode 118B to present a dark state. Under the status shown in FIG. 1C, based on the large portion of the area of the opening 142 exposed in the second fluid 160, the incident light coming from the outside can pass through the first fluid 150 to be reflected by the reflective layer or the pixel electrode 118B to present a bright state. With the operation described above, the electro-wetting display panel 100 may display different gray levels to show a desired image.

In the embodiment, a shielding electrode 118C is configured between the dielectric layer 130 and the active device 118A so that the influence of the electrical signal transmission by the active device 118A on the dielectric layer 130 will be blocked. Therefore, in the embodiment, when the bright state is presented, the second fluid 160 may be concentrated above the active device 118A, that is, at least blocks the region where the active device 118A is located; or the active device 118A is located in the concentrating region R. Consequently, the opaque active device 118A and the second fluid 160 are stacked together so that the transparent area increases to improve the display aperture ratio.

Figure 2:
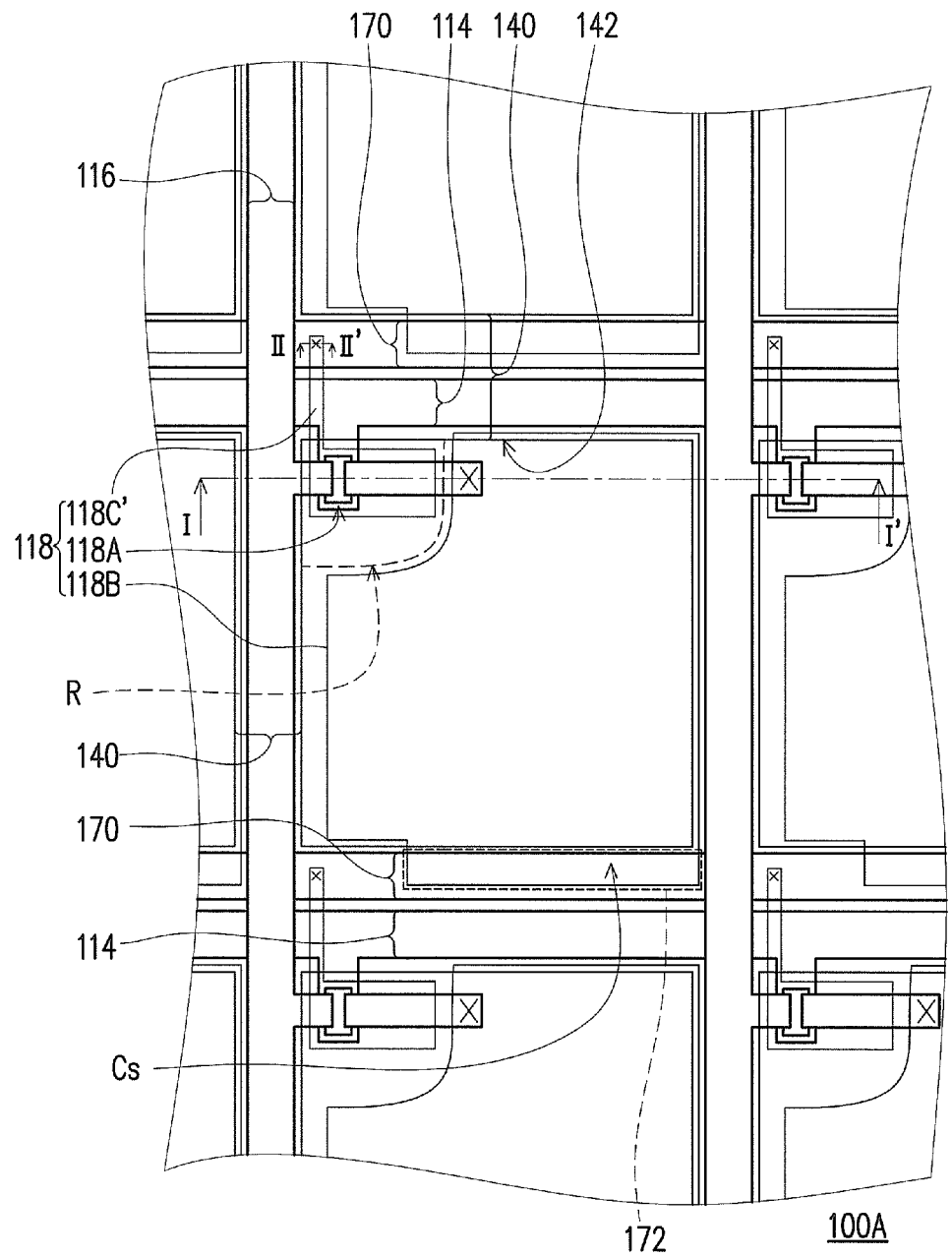
FIG. 2 is a local top view illustrating an electro-wetting display panel in a second embodiment of the disclosure.

FIG. 2 is a local top view illustrating an electro-wetting display panel in a second embodiment of the disclosure. Please refer to FIG. 2. The electro-wetting display panel 100A is mostly the same as the electro-wetting display panel 100; the same components of the two panels are labeled with the same reference numbers. The similarity between the two panels will not be repeated herein. Specifically, in the electro-wetting display panel 100A, the pixel structure 118 is arranged in arrays. Moreover, the pixel structure 118 in each array corresponds to one of the common electrode lines 170. In the embodiment, the shielding electrode 118C' extends toward the pixel structure 118 in the previous array or the subsequent array to be connected to the common electrode lines 170 corresponding to the pixel structure 118 in the previous array or the subsequent array. Therefore, the shielding electrode 118C' may cross over the scan lines 114.

Figure 3A:
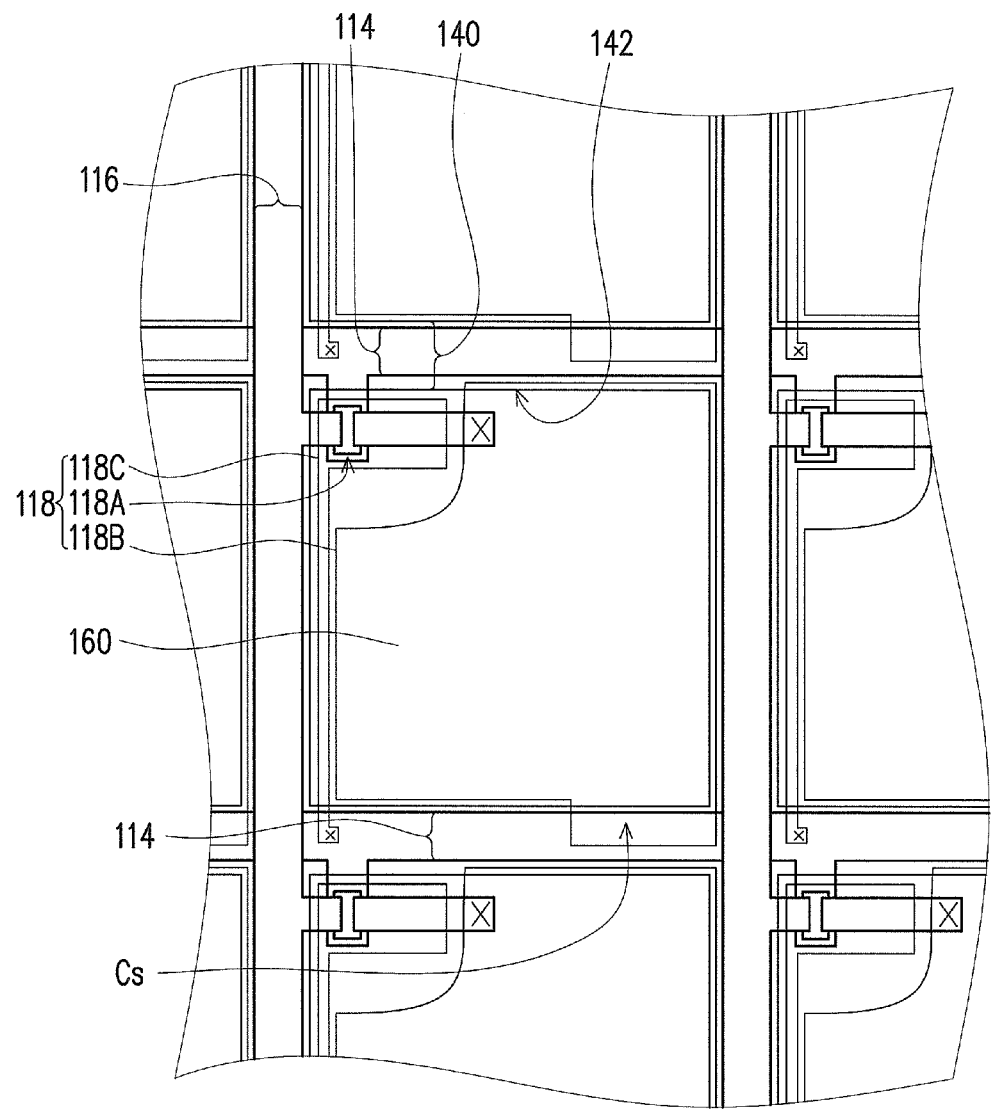
FIG. 3A is a local top view illustrating an electro-wetting display panel in a third embodiment of the disclosure.

In the aforementioned embodiments, the pixel structure 118 includes a shielding electrode 118C or 118C' blocking the active device 118A, and the shielding electrode 118C or 118C' is electrically connected to the common electrode lines 170 so as to be connected to a reference potential; however, the disclosure is not limited thereto. FIG. 3 is a local top view illustrating an electro-wetting display panel in a third embodiment of the disclosure. Please refer to FIG. 3A. The electro-wetting display panel 200 is mostly the same as the electro-wetting display panel 100. Moreover, the same components of the two panels are labeled with the same reference numbers. The similarities will not be repeated herein. Specifically, the difference between the electro-wetting display panel 200 and the electro-wetting display panel 100 lies in that, in each of the pixel structures 118 of the electro-wetting display panel 200, the shielding electrode 118C and the active device 118A are respectively connected to different scan lines 114. That is to say, for the same pixel structure 118, when the active device 118A is connected to the $i^{th}$ scan line 114, the shielding electrode 118C is connected to the $j^{th}$ scan line, wherein i and j are positive integers, and j is not equal to i. At this time, the pixel electrode 118B of each of the pixel structures 118 may be optionally connected to the previous scan line 114 or the subsequent scan line 114 to constitute a structural design in which the storage capacitor structure Cs is on the scan lines 114. Certainly, in other embodiments, the storage capacitor structure Cs may be generally constituted by the pixel electrode 118B and additionally configured common electrode lines 170 as shown in FIG. 1.

Figure 3B:
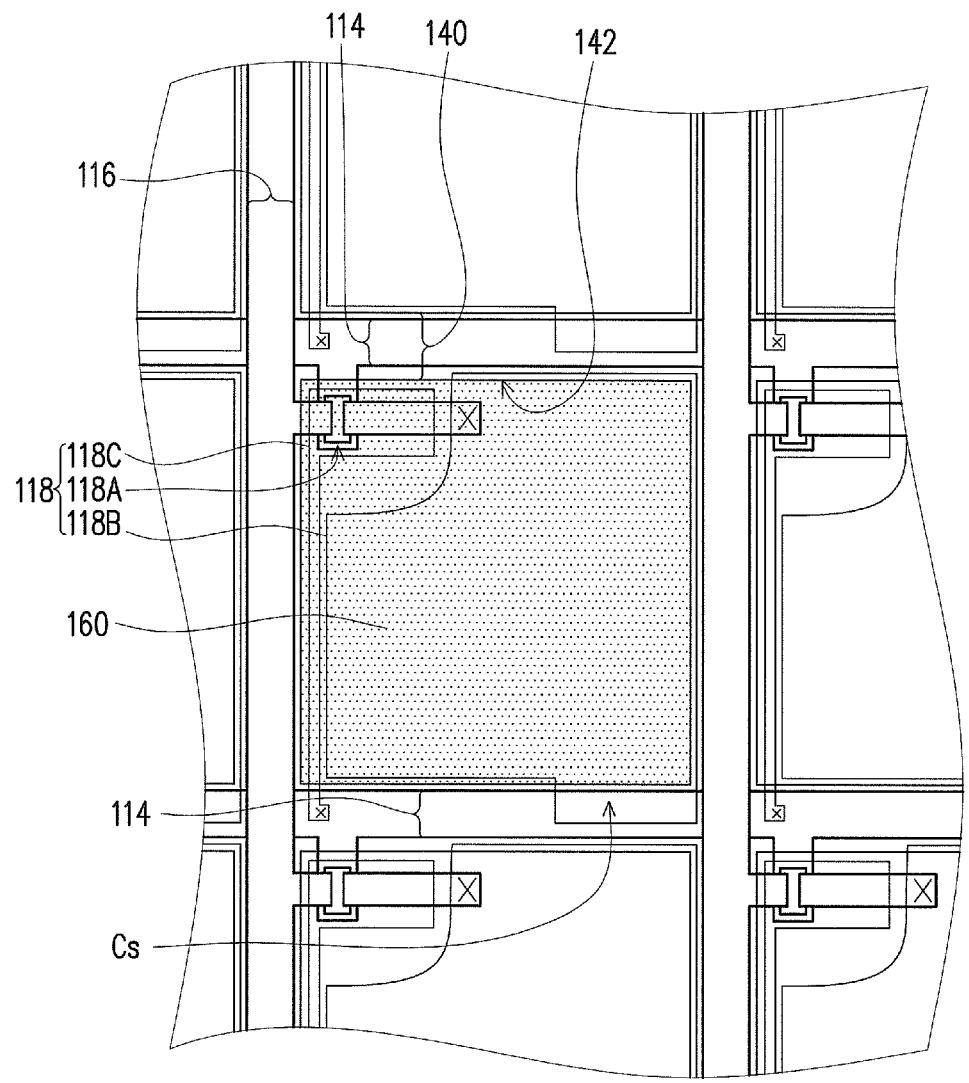
FIGS. 3B and 3C are schematic views illustrating the electro-wetting display panel in FIG. 3A during operation, wherein a shadow region in FIGS. 3B and 3C represents the distribution of a second fluid in one of the pixel structures.
Figure 3C:
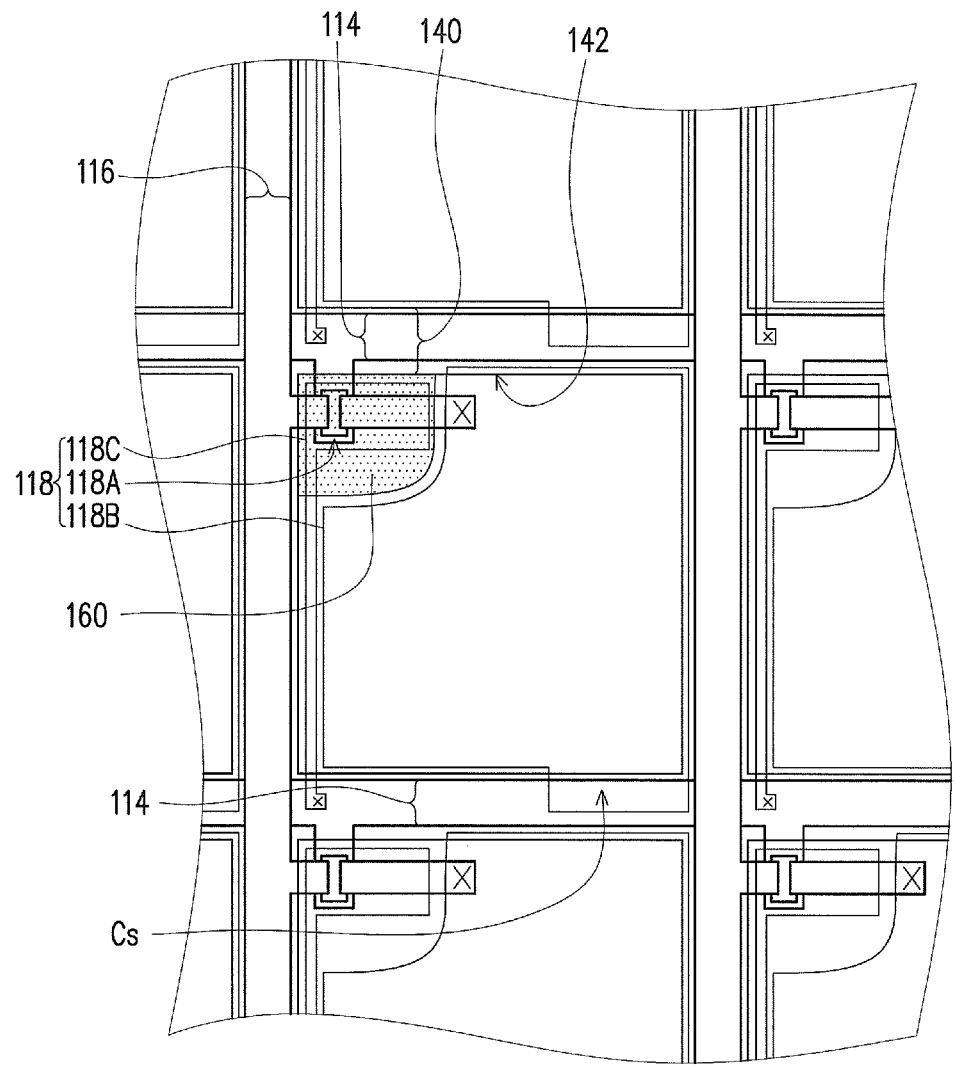

Specifically, FIGS. 3B and 3C are schematic views illustrating an electro-wetting display panel 200 in FIG. 3A during operation, wherein a shadow region in FIGS. 3B and 3C represents the distribution of the second fluid in one of the pixel structures. Please refer to FIG. 3B first. When the operation voltage is not applied to the electro-wetting display panel 200, such as in a stand-by status, the second fluid 160 may be uniformly distributed in a region surrounded by the rib structure 140. At this time, if the second fluid 160 has a light absorptive property or a light shielding property, then the corresponding pixel structure 118 will present a dark state. In FIG. 3C, the operation voltage is applied to the electro-wetting display panel 200, and therefore the distribution of the second fluid 160 will be concentrated near the active device 118A. At this time, since the pixel structure 118 includes a shielding electrode 118C so that the interference from the electrical signal in the active device 118A can be blocked. Consequently, the second fluid 160 may be stably distributed above the active device 118A to be overlapped with the active device 118A.

Figure 4A:
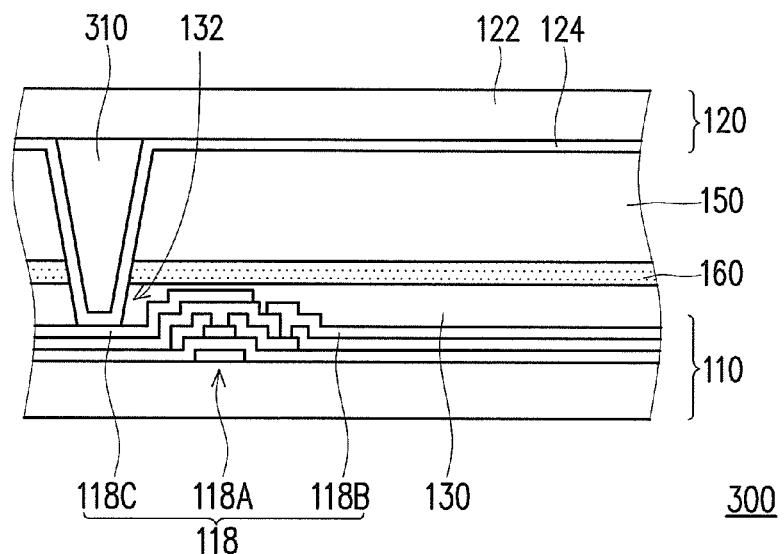
Figure 4B:
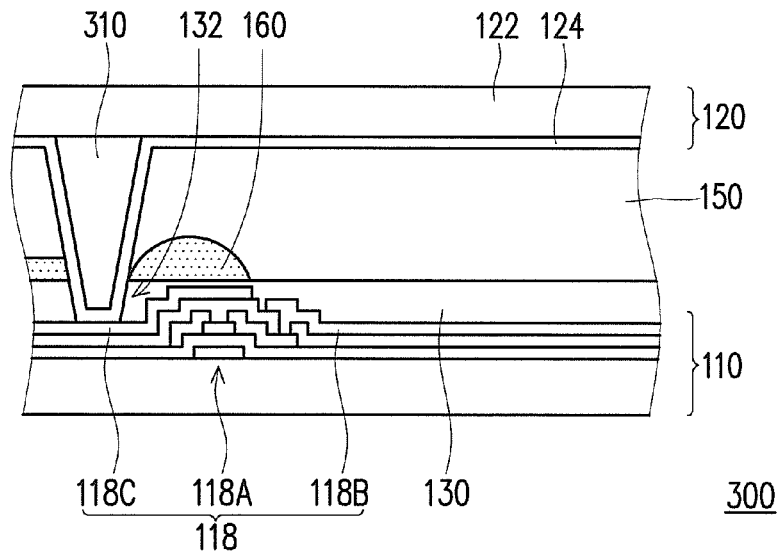

In addition, FIGS. 4A and 4B are local cross-sectional views illustrating an electro-wetting display panel in a fourth embodiment in the disclosure, wherein FIGS. 4A and 4B represent different statuses. Please refer to FIG. 4A first. The electro-wetting display panel 300 is mostly the same as the electro-wetting display panel 100. Moreover, the same components of the two panels are labeled with the same reference numbers. The similarities are not repeated herein. Specifically, the difference between the electro-wetting display panel 300 and the eletro-wetting display panel 100 lies in that, in each of the pixel structures 118 of the electro-wetting display panel 300, the shielding electrode 118C is connected to an opposite electrode 124 on the opposite substrate 120 via a conductive component.

Here, the electro-wetting display panel 300, for example, further includes a spacer 310 configured on the second substrate 122. An end of the spacer 310 is connected to the second substrate 122, and another end, for example, leans against the active device array substrate 110. In addition, the opposite electrode 124 covers the spacer 310 and the surface of the second substrate 122. Thus, based on the configuration of the spacer 310, the opposite electrode 124 may be in contact with the shielding electrode 118C on the active device array substrate 110. Here, an opening 132 may be configured in the dielectric layer 130 to allow the spacer 310 to be protruding toward the opening 132 to realize the contact between the opposite electrode 124 with the shielding electrode 118C.

In FIG. 4A, the electro-wetting display panel 300 is, for example, in a stand-by status or in a status of being input with operation voltage. Therefore, the second fluid 160 is mostly distributed uniformly on the dielectric layer 130. After the operation voltage is inputted in the electro-wetting display panel 300, the distribution of the second fluid 160 is distributed as shown in FIG. 4B, which is intensively distributed above the active device 118A. When the second fluid 160 has a light shielding or a light absorptive property, FIG. 4B may present a bright state and FIG. 4A may present a dark state.

Figure 4C:
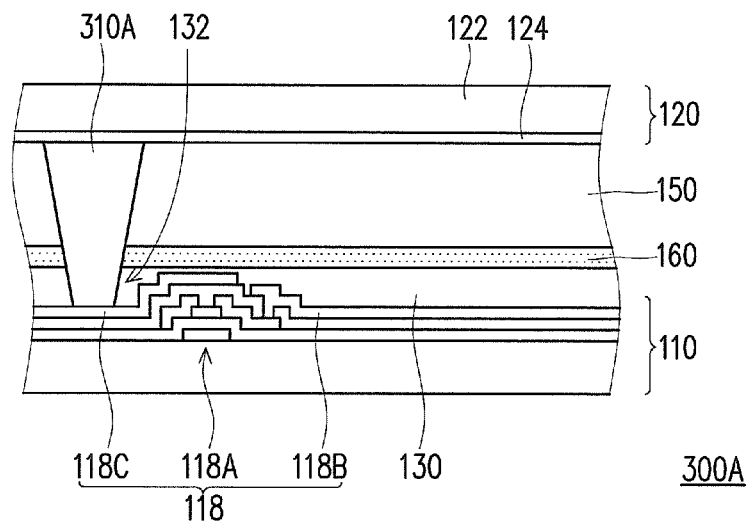
FIG. 4C is a local cross-sectional view illustrating an electro-wetting display panel in a fifth embodiment in the disclosure.

FIG. 4C is a local cross-sectional view illustrating an electro-wetting display panel in a fifth embodiment in the disclosure. Please refer to FIG. 4C. The electro-wetting display panel 300A is mostly the same as the electro-wetting display panel 300; the same components in the two panels are labeled with the same reference numbers. The similarities are not repeated herein. Specifically, the difference between the electro-wetting display panel 300A and the electro-wetting display panel 300 lies in that the spacer 310A is formed of a conductive material so as to directly provide a function as a conductive component. At this time, the opposite electrode 124 may optionally not have to cover the spacer 310A to be located between the spacer 310A and the second substrate 122.

In the embodiments in FIGS. 3A and 4A, the shielding electrode 118C above the active device 118A is connected to a reference potential to block the influence of the electrical signal transmission by the active device on the first fluid 150. Therefore, when the second fluid 160 is driven by the pixel electrode 118B to be concentrated, it may be concentrated above the active device 118A so as to increase the display aperture ratio of the pixel structure 118. It should be noted that the aforementioned embodiments are not intended to limit the disclosure. In other embodiments, any design that allows the shielding electrode 118C to be concentrated to the reference potential may be used as one of the embodiments in the disclosure. For example, in other embodiments, when an electrostatic discharge protector structure connected to a ground potential is configured on the electro-wetting display panel, all the shielding electrode of the pixel structures may be connected to the electrostatic discharge protector structure. In addition, apart from blocking the active device, the shielding electrode may also optionally block other conductive components on the active device array substrate, such as a storage capacitor structure.

Figure 5:
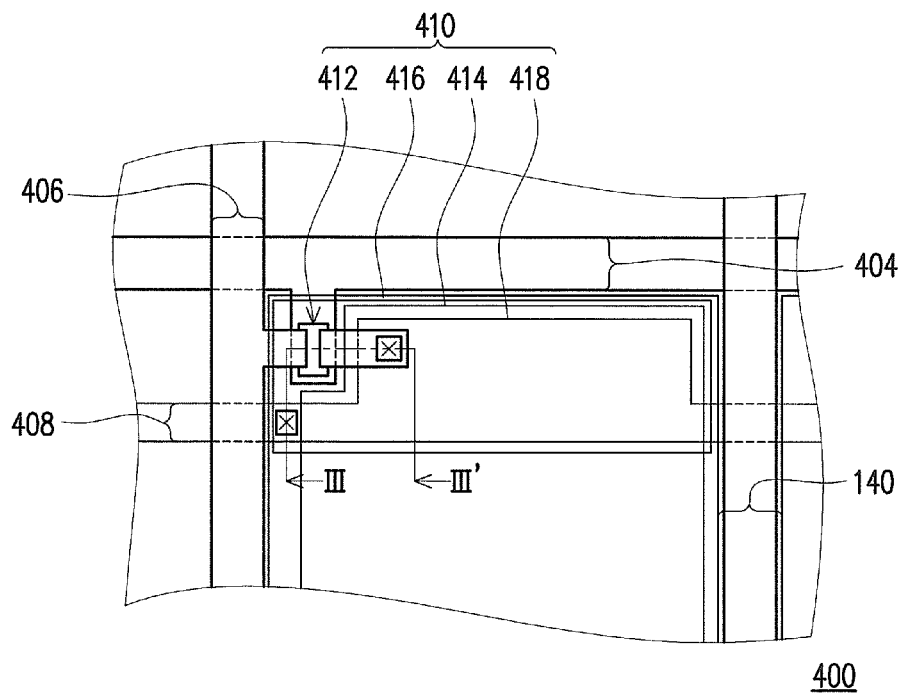
FIG. 5 is a local top view illustrating an electro-wetting display panel in a sixth embodiment of the disclosure.
Figure 6A:
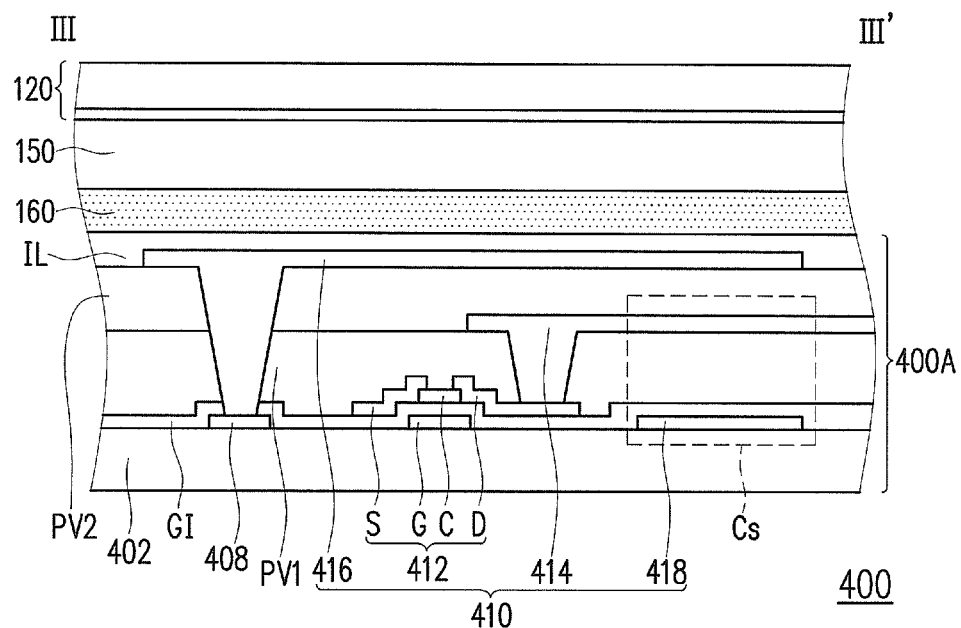
Figure 6B:
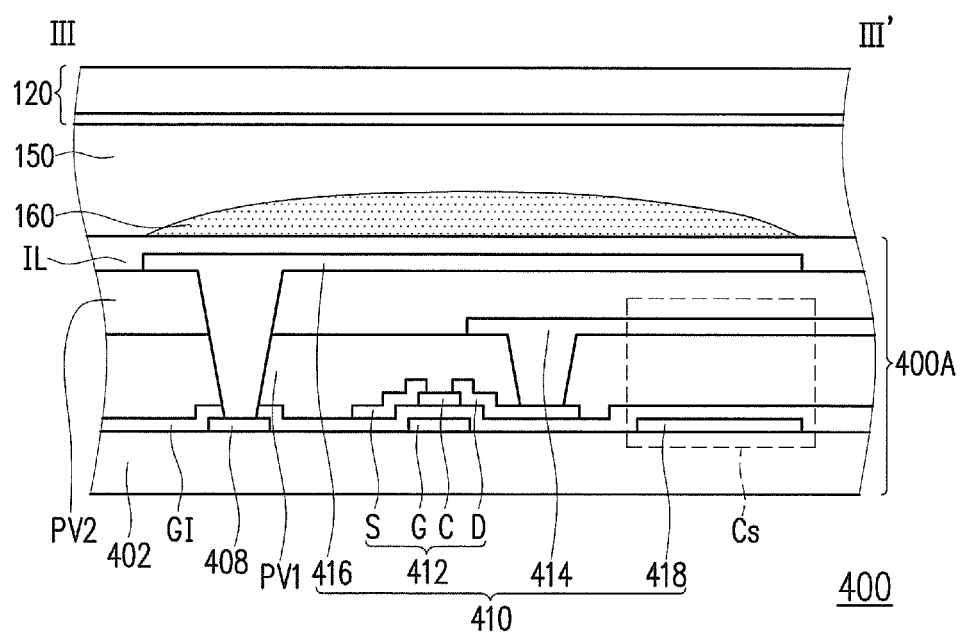

For example, FIG. 5 is a local top view illustrating the electro-wetting display panel in a sixth embodiment of the disclosure. FIGS. 6A and 6B are cross-sectional views illustrating the electro-wetting display panel in FIG. 5 cut along line III-III', wherein FIGS. 6A and 6B represent different statuses. Please refer to both FIGS. 5 and 6. The electro-wetting display panel 400 is mostly the same as the foregoing electro-wetting display panel. Therefore, in the embodiment, the reference numbers for some of the components denote identical or similar meanings as described in the previous paragraphs. However, the active device array substrate 400A in the embodiment is different from the active device array substrate 110 illustrated in FIGS. 1B and 1C.

The active device array substrate 400A includes a first substrate 402, a scan line 404, a data line 406, a common electrode line 408, and a pixel structure 410. In the embodiment, in order to keep the figure clear and simple, only one scan line 404, one data line 406, one common electrode line 408, and one pixel structure 410 are illustrated, which should not be construed as limitations to the disclosure. In other words, in practical implementations, a plurality of scan lines 404, data lines 406, common electrode lines 408 and the pixel structures 410 are adopted and they are arranged in arrays.

The pixel structure 410 includes an active device 412, a pixel electrode 414, a shielding electrode 416, and a storage capacitor electrode 418. The active device 412 includes a gate G, a channel layer C, a source S, and a drain D. Similar to the aforementioned embodiments, the gate G is connected to the scan line 404, the source S is connected to the data line 406, and the drain D is connected to the pixel electrode 414. The storage capacitor electrode 418 is connected to the common electrode line 408 and may be integrally formed with the common electrode line 408. Meanwhile, a portion of the pixel electrode 414 and the storage capacitor electrode 418 are stacked vertically to constitute a storage capacitor structure Cs. In addition, in the embodiment, the shielding electrode 416 is electrically connected to the common electrode line 408. However, in other embodiments, the shielding electrode 416 may optionally be electrically connected to other scan lines 404 (as shown in FIG. 3A), or electrically connected to the electrode on the opposite substrate (as shown in FIG. 4A).

Specifically, in order to realize electrical independence of each component, the active device array substrate 400 also includes a gate insulating layer G1, a first protecting layer PV1, a second protecting layer PV2 and a dielectric layer IL. The gate insulating layer G1 is located between the gate G and the channel layer C and covers the scan line 404, the common electrode line 408, and the storage capacitor electrode 418. The first protecting layer PV1 covers the active device 412 and located between the storage capacitor electrode 418 and the pixel electrode 414. The second protection layer PV2 covers the pixel electrode 414 so that the pixel electrode 414 and the shielding electrode 416 are separated from each other. That is to say, the pixel electrode 414 in the embodiment and the shielding electrode 416 are formed of different film layers. Moreover, the second protecting layer PV2 is sandwiched between the pixel electrode 414 and the shielding electrode 416. In addition, the dielectric layer IL covers the pixel structure 410 so that the entire pixel structure 410 is located between the dielectric layer IL and the first substrate 402. Here, the property of dielectric layer IL is mostly the same as the dielectric layer 130 described in the aforementioned embodiments, and therefore no further descriptions are incorporated herein.

FIGS. 5 and 6A show that the storage capacitor structure Cs and the active device 412 in the embodiment are blocked by the shielding electrode 416; that is, they are both located between the shielding electrode 416 and the first substrate 402. In the meantime, the shielding electrode 416 is electrically connected to the common electrode line 408 and has a common potential, such as a ground potential or a reference potential. When the pixel structure 410 drives the first fluid 150 and the second fluid 160, which allows the second fluid 160 to be concentrated at a position where the shielding electrode 416 is located. For example, FIG. 6B represents a status where the pixel structure 410 inputs the operation voltage to drive the first fluid 150 and the second fluid 160. At this time, the second fluid 160 will be located above the active device 412 and the storage capacitor structure Cs. When the active device 412 and the storage capacitor structure Cs are designed to be opaque or have low level of transparency, that the second fluid 160 is concentrated above the active device 412 and the storage capacitor structure Cs may be regarded as that the opaque or low transparent devices are stacked in the same region, which facilitates to increase the area of a transparent region or reduce the area of a non-transparent region. Therefore, the active device array substrate 400A being applied in the electro-wetting display panel 400 helps to promote display aperture ratio.

Figure 7:
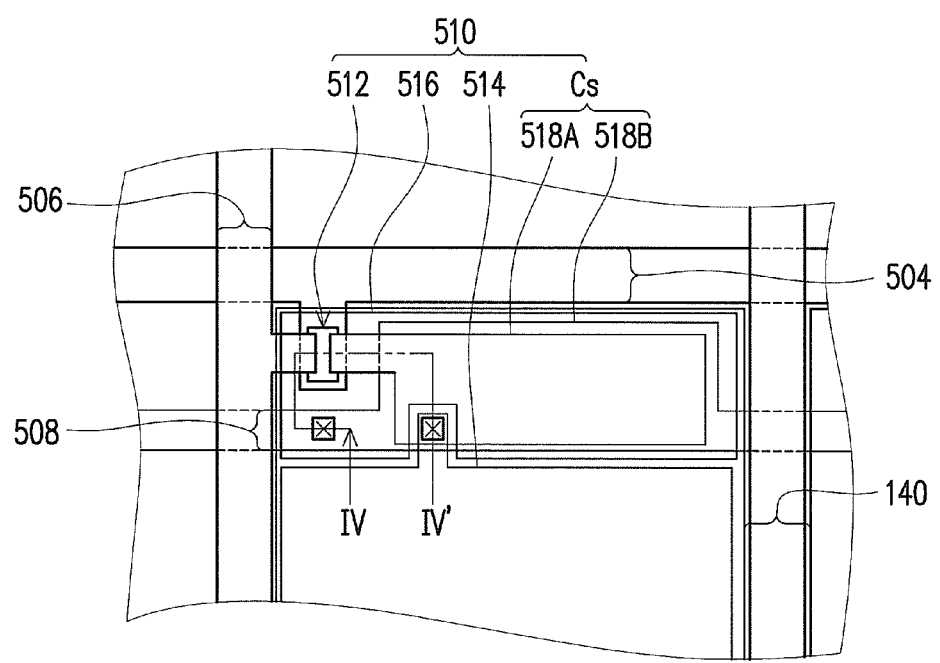
FIG. 7 is a local top view illustrating an electro-wetting display panel in a seventh embodiment in the disclosure.
Figure 8A:
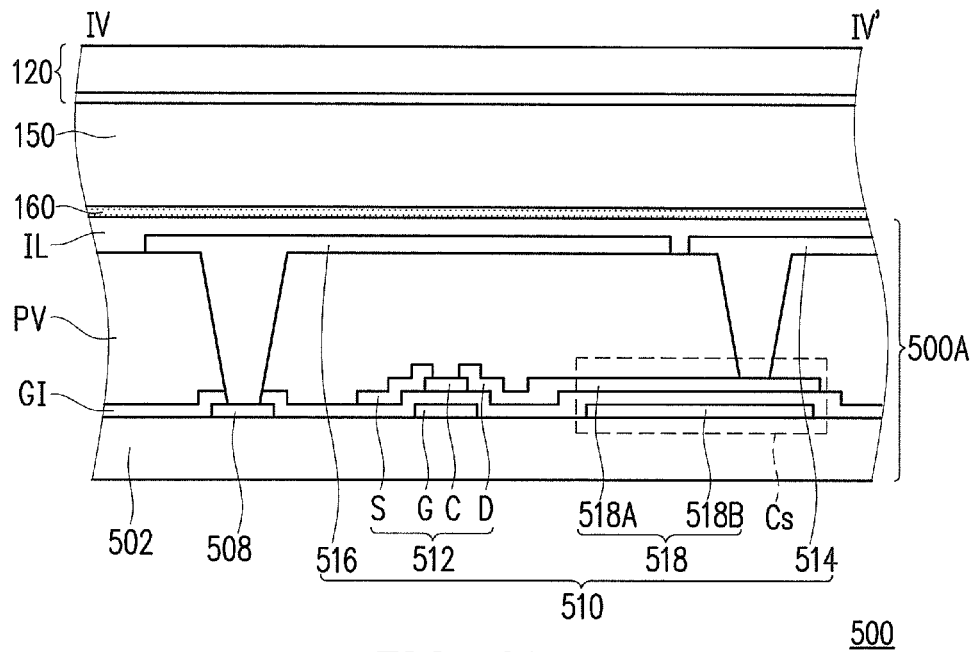
Figure 8B:
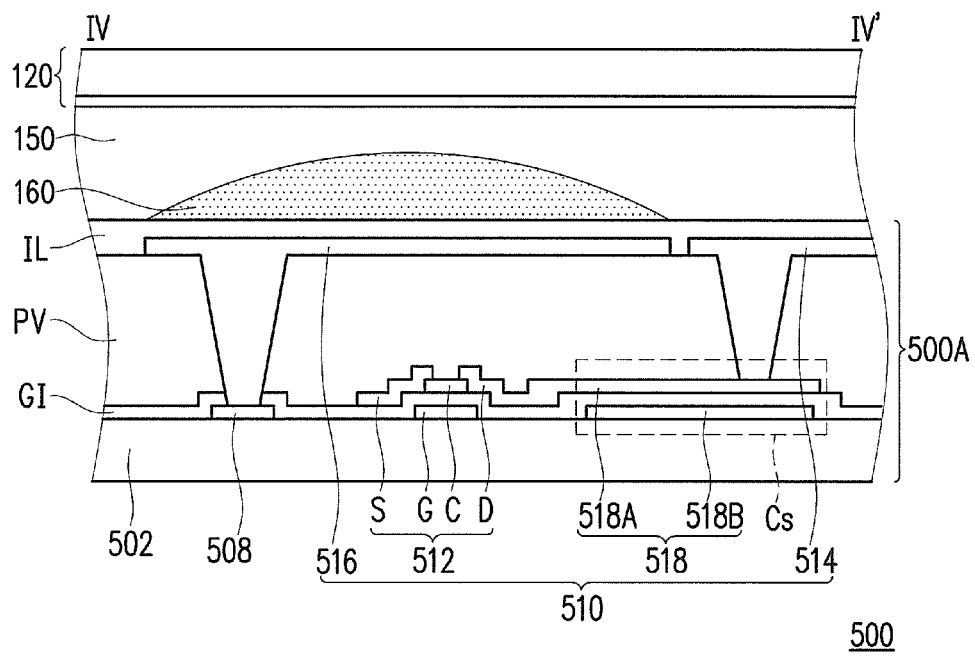

FIG. 7 is a local top view illustrating an electro-wetting display panel in a seventh embodiment in the disclosure. FIGS. 8A and 8B are cross-sectional views illustrating an electro-wetting display panel in FIG. 7 cut along line IV-IV', wherein FIGS. 8A and 8B represent different statuses. Please refer to both FIGS. 7 and 8. The electro-wetting display panel 500 is similar to the aforementioned electro-wetting display panel 400; however, the active device array substrate 500A in the embodiment is different from the active device array substrate 400A.

The active device array substrate 500A and 500 in FIGS. 7 and 8A includes a first substrate 502, a scan line 504, a data line 506, a common electrode line 508, and a pixel structure 510. In the embodiment, in order to keep the drawing to be clear and simple, only one scan line 504, one data line 506, one common electrode line 508, and one pixel structure 510 are illustrated, which should not be construed as limitations to the disclosure. In other words, in practical implementations, the scan line 504, the data line 506, the common electrode line 508, and the pixel structure 510 are in multiple numbers respectively, and they are arranged in arrays.

The pixel structure 510 includes an active device 512, a pixel electrode 514, a shielding electrode 516, and a capacitor electrode 518, wherein the capacitor electrode 518 includes a storage capacitor upper electrode 518A and a storage capacitor lower electrode 518B. The active device 512 includes a gate G, a channel layer C, a source S, and a drain D. Similar to the previous embodiments, the gate G is connected to the scan line 504, the source S is connected to the data line 506, and the drain D is connected to the pixel electrode 514. The storage capacitor upper electrode 518A is connected to the drain D and substantially formed integrally with the drain D, and is also electrically connected to the pixel electrode 514. The storage capacitor lower electrode 518B is connected to the common electrode line 508 and may be formed integrally with the common electrode line 508. Meanwhile, the storage capacitor upper electrode 518A and the storage capacitor lower electrode 518B are stacked vertically to constitute a storage capacitor structure Cs. In addition, the shielding electrode 516 in the embodiment is electrically connected to the common electrode line 508 and is in the same film layer as the pixel electrode 514. However, in other embodiments, the shielding electrode 516 may optionally be electrically connected to other scan lines 504 (as shown in FIG. 3A) or electrically connected to the electrode on the opposite substrate (as shown in FIG. 4A).

Specifically, in order to realize electrical independence of each component, the active device array substrate 500 further includes a gate insulating layer GI, a protecting layer PV, and a dielectric layer IL. The gate insulating layer GI is located between the gate G and the channel layer C and covers the scan line 504, the common electrode line 508, and the storage capacitor lower electrode 518B. The protecting layer PV covers the active device 512 and the storage capacitor structure Cs. In addition, the dielectric layer IL covers the pixel structure 510, such that the entire pixel structure 510 is positioned between the dielectric layer IL and the first substrate 502. Here, the property of the dielectric layer IL is mostly the same as the dielectric layer 130 described in the previous embodiment; therefore, no further description is incorporated herein.

FIGS. 7 and 8A show that the storage capacitor structure Cs and the active device 512 in the embodiment are all blocked by the shielding electrode 516. That is, they are all positioned between the shielding electrode 516 and the first substrate 502. In the meantime, the shielding electrode 516 is electrically connected to the common electrode line 508 and has a common electric potential, such as a ground potential or a reference potential. When the pixel structure 510 drives the first fluid 150 and the second fluid 160 as shown in FIG. 8B, the second fluid 160 may be concentrated at a position where the shielding electrode 516 is located. At this time, the second fluid 160 will be located above the active device 512 and the storage capacitor structure Cs. When the active device 512 and the storage capacitor structure Cs are designed to be opaque or have low level of transparency, that the second fluid 160 is concentrated above the active device 512 and the storage capacitor structure Cs may be regarded as that the opaque or low transparent devices are stacked in the same region, which facilitates to increase the area of a transparent region or reduce the area of a non-transparent region. Therefore, the active device array substrate 500A being applied in the electro-wetting display panel 500 helps to promote the display aperture ratio.

To sum up, the electro-wetting display panel in the embodiments of the disclosure, a shielding electrode connected to the ground or common potential is configured above the active device. Therefore, the opaque fluid in the electro-wetting display panel may be concentrated above the active device without being interfered by the electrical signal of the active device. Furthermore, the opaque fluid in the electro-wetting display panel may be further concentrated above the storage capacitor structure. In that case, the opaque active device, the storage capacitor structure, and the design of stacked opaque fluid help to increase the display aperture ratio of the electro-wetting display panel.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electro-wetting display panel, comprising:
an active device array substrate, comprising a first substrate and a plurality of pixel structures, the pixel structures being configured on the first substrate, wherein each of the pixel structures comprises a shielding electrode, an active device and a pixel electrode electrically connected to the active device, the active device is positioned between at least a portion of a region of the shielding electrode and the first substrate, and the shielding electrode is electrically connected to a common potential;
a dielectric layer configured on the active device array substrate and covering the pixel structure;
a rib structure configured on the active device array substrate and having a plurality of openings, and the active device of each of the pixel structures and the pixel electrode being positioned within one of the openings;
an opposite substrate, the pixel structures located between the first substrate and the opposite substrate;
a first fluid, configured between the dielectric layer and the opposite substrate; and
a second fluid, configured between the dielectric layer and the first fluid.

2. The electro-wetting display panel according to claim 1, wherein the rib structure is hydrophilic, and the dielectric layer is hydrophobic, or formed of at last one insulating film layer and at least one hydrophobic film layer, when the first fluid is a polar fluid and the second fluid is a non-polar fluid.

3. The electro-wetting display panel according to claim 1, wherein the active device array substrate further comprises a plurality of scan lines and a plurality of data lines, the scan lines turns on or off the active devices of the pixel structures so as to transmit voltage on the data lines to corresponding pixel electrodes through the active devices.

4. The electro-wetting display panel according to claim 3, wherein the second fluid is concentrated above the active device when each of the pixel structures is turned on.

5. The electro-wetting display panel according to claim 1, wherein the active device array substrate further comprises at least one common electrode line to provide the common potential.

6. The electro-wetting display panel according to claim 5, wherein the shielding electrode of each of the pixel structures is connected to the common electrode line, and the common potential is a ground potential or a reference potential.

7. The electro-wetting display panel according to claim 5, wherein each of the pixel structures further comprises a storage capacitor upper electrode and a storage capacitor lower electrode, the storage capacitor lower electrode is connected to the common electrode line, the storage capacitor upper electrode is connected to the pixel electrode, and the storage capacitor upper electrode and the storage capacitor lower electrode are stacked upper and bottom to form a storage capacitor structure.

8. The electro-wetting display panel according to claim 7, wherein the storage capacitor structure is located between the shielding electrode and the substrate.

9. The electro-wetting display panel according to claim 1, wherein the pixel electrode and the shielding electrode are formed of the same film layer.

10. The electro-wetting display panel according to claim 5, wherein each of the pixel structures further comprises a storage capacitor electrode, the storage capacitor electrode is connected to the common electrode line, and the storage capacitor electrode and the pixel electrode are stacked upper and bottom to form a storage capacitor structure.

11. The electro-wetting display panel according to claim 10, further comprising a protecting layer sandwiched between the shielding electrode and the pixel electrode, the shielding electrode is located between the protecting layer and the dielectric layer, and the storage capacitor structure is located between the shielding electrode and the substrate.

12. The electro-wetting display panel according to claim 1, wherein the opposite substrate comprises a second substrate and an opposite electrode configured on the second substrate.

13. The electro-wetting display panel according to claim 12, further comprising a plurality of conductive structures, wherein the conductive structures electrically connect the shielding electrodes of the pixel structures to the opposite electrode.

14. An electro-wetting display panel, comprising:
an active device array substrate, comprising a first substrate, a plurality of scan lines, a plurality of data lines, and a plurality of pixel structures, the pixel structures being configured on the first substrate, each of the pixel structures comprising a shielding electrode, an active device, and a pixel electrode electrically connected to the active device, the active device being positioned between at least a portion of a region of the shielding electrode and the first substrate, wherein the scan lines turns on or off the active devices of the pixel structures so as to correspondingly transmit voltage on the data lines to the pixel electrodes through the active devices, and the shielding electrode of each of the pixel structures and the active device are respectively connected to $i^{th}$ and $j^{th}$ scan lines, i and j are positive integers, and j is not equal to i;
a dielectric layer, configured on the active device array substrate and covering the pixel structures;
a rib structure, configured on the active device array substrate and having a plurality of openings, and the active device of each of the pixel structures and the pixel electrode being positioned within one of the openings;
an opposite substrate, the pixel structures positioned between the first substrate and the opposite substrate;
a first fluid, configured between the dielectric layer and the opposite substrate; and
a second fluid, configured between the dielectric layer and the first fluid.

15. The electro-wetting display panel according to claim 14, wherein the rib structure is hydrophilic, and the dielectric layer itself is hydrophobic, or formed of at least one insulating film layer and at least one hydrophobic film layer when the first fluid is a polar fluid and the second fluid is a non-polar fluid.

16. The electro-wetting display panel according to claim 14, wherein the second fluid is concentrated above the active device when the pixel structure is turned on.

17. The electro-wetting display panel according to claim 14, wherein the pixel electrode and the shielding electrode are formed of the same film layer.

18. The electro-wetting display panel according to claim 14, wherein the opposite substrate comprises a second substrate and an opposite electrode configured on the second substrate.

19. The electro-wetting display panel according to claim 4, wherein the second fluid is further concentrated above the shielding electrode.

20. The electro-wetting display panel according to claim 16, wherein the second fluid is further concentrated above the shielding electrode.

* * * * *